(12) United States Patent  
Nandagopalan et al.

(10) Patent No.: US 8,116,201 B2  
(45) Date of Patent: Feb. 14, 2012

(54) ROUTING IN A MESH NETWORK

(75) Inventors: Saishankar Nandagopalan, San Diego, CA (US); Santosh Abraham, San Diego, CA (US); Sanjiv Nanda, Ramona, CA (US)

(73) Assignee: QUALCOMM Incorporated, San Diego, CA (US)

( * ) Notice: Subject to any disclaimer, the term of this patent is extended or adjusted under 35 U.S.C. 154(b) by 338 days.

(21) Appl. No.: 11/746,848

(22) Filed: May 10, 2007

(65) Prior Publication Data

US 2007/0274228 A1 Nov. 29, 2007

Related U.S. Application Data

(60) Provisional application No. 60/799,828, filed on May 11, 2006.

(51) Int. Cl.  
*H04Q 7/00* (2006.01)

(52) U.S. Cl. ........................................ 370/232

(58) Field of Classification Search ............... 370/310, 370/229, 230, 232, 235, 252, 338, 315, 351  
See application file for complete search history.

(56) References Cited

U.S. PATENT DOCUMENTS

| | | | |
|---|---|---|---|
| 6,735,178 B1 * | 5/2004 | Srivastava et al. | 370/252 |
| 7,230,920 B1 * | 6/2007 | Stratigakis | 370/230 |
| 7,269,155 B2 * | 9/2007 | Joshi | 370/338 |
| 7,542,449 B2 * | 6/2009 | Kim et al. | 370/331 |
| 7,606,178 B2 * | 10/2009 | Rahman et al. | 370/256 |
| 2003/0043773 A1 | 3/2003 | Chang | |
| 2005/0041628 A1 | 2/2005 | Duggi et al. | |
| 2007/0127386 A1 * | 6/2007 | Joshi et al. | 370/252 |

FOREIGN PATENT DOCUMENTS

| | | | |
|---|---|---|---|
| JP | 2002118597 A | 4/2002 | |
| JP | 2004282244 A | 10/2004 | |
| JP | 2005033557 A | 2/2005 | |
| JP | 2005079827 A | 3/2005 | |
| JP | 2007074564 A | 3/2007 | |

(Continued)

OTHER PUBLICATIONS

Oueslati-Boulahia, et al., "An Approach to Routing Elastic Flows," Presented at the International Teletraffic Congress, Edinburgh, Jun. 7-11 1998, pp. 1311-1320.

(Continued)

*Primary Examiner* — Kwang B Yao  
*Assistant Examiner* — Anh Ngoc Nguyen  
(74) *Attorney, Agent, or Firm* — Nicholas J. Pauley; Peter M. Kamarchik; Jonathan T. Velasco

(57) ABSTRACT

An apparatus includes a processing system configured to establish a link with any one of a plurality of access points in a mesh network, each of the access points providing the apparatus with a different data path through the mesh network. The processing system is further configured to compute a metric for each of the data paths and select one of the access points to establish the link with based on the metrics. In a centralized mesh network, an apparatus includes a processing system configured to compute, for each of the access points, a metric for each of a plurality of data paths supportable by that access point, and establish interconnections between the access points based on the metrics.

21 Claims, 8 Drawing Sheets

FOREIGN PATENT DOCUMENTS

| WO | WO9516240 | 6/1995 |
|----|-----------|--------|
| WO | 0225969 | 3/2002 |
| WO | WO03101132 A1 | 12/2003 |
| WO | WO2005079025 A1 | 8/2005 |
| WO | 2005117348 | 12/2005 |

OTHER PUBLICATIONS

Tabet, et al., "Throughput Analysis for Decentralized Slotted Regular Wireless Networks," Presented at the 37th Asilomar Conference on Signals, Systems, & Computers. Pacific Grove, CA, Nov. 9-12, 2003, pp. 1703-1707.

Writen Opinion—PCT/US07/068697, International Preliminary Examining Authority—European Patent Office, Jun. 27, 2008.

International Preliminary Report on Patentability—PCT/US07/068697, IPEA—European Patent Office, Aug. 28, 2008.

Bicket, J. et al.: "Architecture and Evaluation of an Unplanned 802.11b Mesh Network," Proceedings of the 11th Annual International Conference on Mobile Computing and Networking, MOBICOM 2005, Cologne, Germany—(Aug. 2005) pp. 1-23, XP001506435, ISBN: 1-59593-020-5.

International Search Report, PCT/US07/068697—International Search Authority, European Patent Office—Jan. 24, 2008.

Faccin, et al., "Mesh WLAN Networks: Concept and System Design", IEEE Wireless Communications pp. 10-17, Apr. 2006.

Taiwanese Search report—096116913—TIPO—Oct. 1, 2010.

\* cited by examiner

ROUTING IN A MESH NETWORK

CLAIM OF PRIORITY UNDER 35 U.S.C. §119

This application is related to and claims the benefit of the filing date of U.S. Provisional Application No. 60/799,828, filed on May 11, 2006, entitled "Optimal Tree Formation for WLANs".

BACKGROUND

1. Field

The present disclosure relates generally to telecommunications, and more particularly, to routing in a mesh network.

2. Background

In wireless communication systems, access networks are generally employed to connect any number of access terminals to a wide area network (WAN), such as the Internet or a Public Switched Telephone Network (PSTN). These access networks are typically implemented with multiple wireless access points dispersed throughout a geographic region. Each of these access points provide a wired backhaul connection to a gateway for the WAN.

A mesh network differs from this tradition approach in that any number of access points may join together to connect access terminals to a gateway. The principle is similar to the way data is routed through the Internet. Basically, the data in the mesh network is routed from one access point to another until it reaches is destination. The throughput of the mesh network will depend on the routes established by the access points to forward data. Thus, it would be advantageous to be able to dynamically establish optimal routing through the mesh network The selection of an optimal path through the mesh network is not a simple task. Changing wireless conditions and the availability of multiple paths through the mesh network presents various challenges. Also, the wireless links between access points do not have fixed data rates. As a result, the traditional approach of establishing the shortest path links between access points may not always be optimal if other arrangements can provide a higher data rate or reduce delay. Accordingly, there is a need in the art to optimize the routing of data through a mesh network to increase throughput.

SUMMARY

In accordance with one aspect of the disclosure, an apparatus includes a processing system configured to establish a link with any one of a plurality of access points in a mesh network, each of the access points providing the apparatus with a different data path through the mesh network, wherein the processing system is further configured to compute a metric for each of the data paths and select one of the access points to establish the link with based on the metrics.

In accordance with another aspect of the disclosure, an apparatus configured to operate in a mesh network having a plurality of access points includes a processing system configured to compute, for each of the access points, a metric for each of a plurality of data paths supportable by that access point, and establish interconnections between the access points based on the metrics.

In accordance with yet another aspect of the disclosure, a method of establishing a link with any one of a plurality of access points in a mesh network, with each of the access points providing a different data path through the mesh network, includes computing a metric for each of the data paths, and selecting one of the access points to establish a link with based on the metrics.

In accordance with a further aspect of the disclosure, a method of operating in a mesh network having a plurality of access points includes computing, for each of the access points, a metric for each of a plurality of data paths supportable by that access point, and establishing interconnections between the access points based on the metrics.

In accordance with yet a further aspect of the disclosure, an apparatus includes means for establishing a link with any one of a plurality of access points in a mesh network, each of the access points providing the apparatus with a different data path through the mesh network, computing means for computing a metric for each of the data paths, and selecting means for selecting one of the access points to establish the link with based on the metrics.

In accordance with still yet a further aspect of the disclosure, an apparatus configured to operate in a mesh network having a plurality of access points includes computing means for computing, for each of the access points, a metric for each of a plurality of data paths supportable by that access point, and means for establishing interconnections between the access points based on the metrics.

In accordance with yet another aspect of the disclosure, an access point includes a processing system configured to establish a link with any one of a plurality of access points in a mesh network, each of the access points providing the apparatus with a different data path through the mesh network, wherein the processing system is further configured to compute a metric for each of the data paths and select one of the access points to establish the link with based on the metrics, and a transceiver configured to support the link between the processing system and the selected access point.

In accordance with still yet another aspect of the disclosure, an apparatus configured to operate in a mesh network having a plurality of access points includes a processing system configured to compute, for each of the access points, a metric for each of a plurality of data paths supportable by that access point, and establish interconnections between the access points based on the metrics, and a transceiver configured to broadcast the information to the access points, the information relating to the interconnections established by the processing system.

In accordance with a further aspect of the disclosure, a computer program product for enabling an apparatus to operate in a mesh network includes computer-readable medium. The computer readable medium includes code to establish a link with any one of a plurality of access points in a mesh network, each of the access points providing the apparatus with a different data path through the mesh network, code to compute a metric for each of the data paths, and code to select one of the access points to establish the link with based on the metrics.

In accordance with yet a further aspect of the disclosure, a computer program product for enabling an apparatus to operate in a mesh network having a plurality of access points includes computer-readable medium. The computer readable medium includes code to compute, for each of the access points, a metric for each of a plurality of data paths supportable by that access point, and code to establish interconnections between the access points based on the metrics.

It is understood that other aspects of the present invention will become readily apparent to those skilled in the art from the following detailed description, wherein it is shown and described only various aspects of the invention by way of illustration. As will be realized, the invention is capable of other and different aspects and its several details are capable of modification in various other respects, all without departing from the scope of the present disclosure. Accordingly, the drawings and detailed description are to be regarded as illustrative in nature and not as restrictive.

BRIEF DESCRIPTION OF THE DRAWINGS

Various aspects of a wireless communications system are illustrated by way of example, and not by way of limitation, in the accompanying drawings, wherein.

DETAILED DESCRIPTION

The detailed description set forth below in connection with the appended drawings is intended as a description of various aspects and is not intended to represent the only aspects that may be practiced. The detailed description includes specific details for the purpose of providing a thorough understanding of the invention. However, it will be apparent to those skilled in the art that the invention may be practiced without these specific details. In some instances, well known structures and components are shown in block diagram to avoid obscuring the concepts of the invention.

In the following detailed description, various concepts will be described in the context of a mesh network. While these concepts are well suited for this application, those skilled in the art will readily appreciate that these concepts are likewise applicable to other access networks. By way of example, a mobile ad-hoc network may benefit from the various concepts provided throughout this disclosure. Accordingly, any reference to a mesh network is intended only to illustrate these concepts, with the understanding that such concepts have a wide range of applications.

Figure 1:
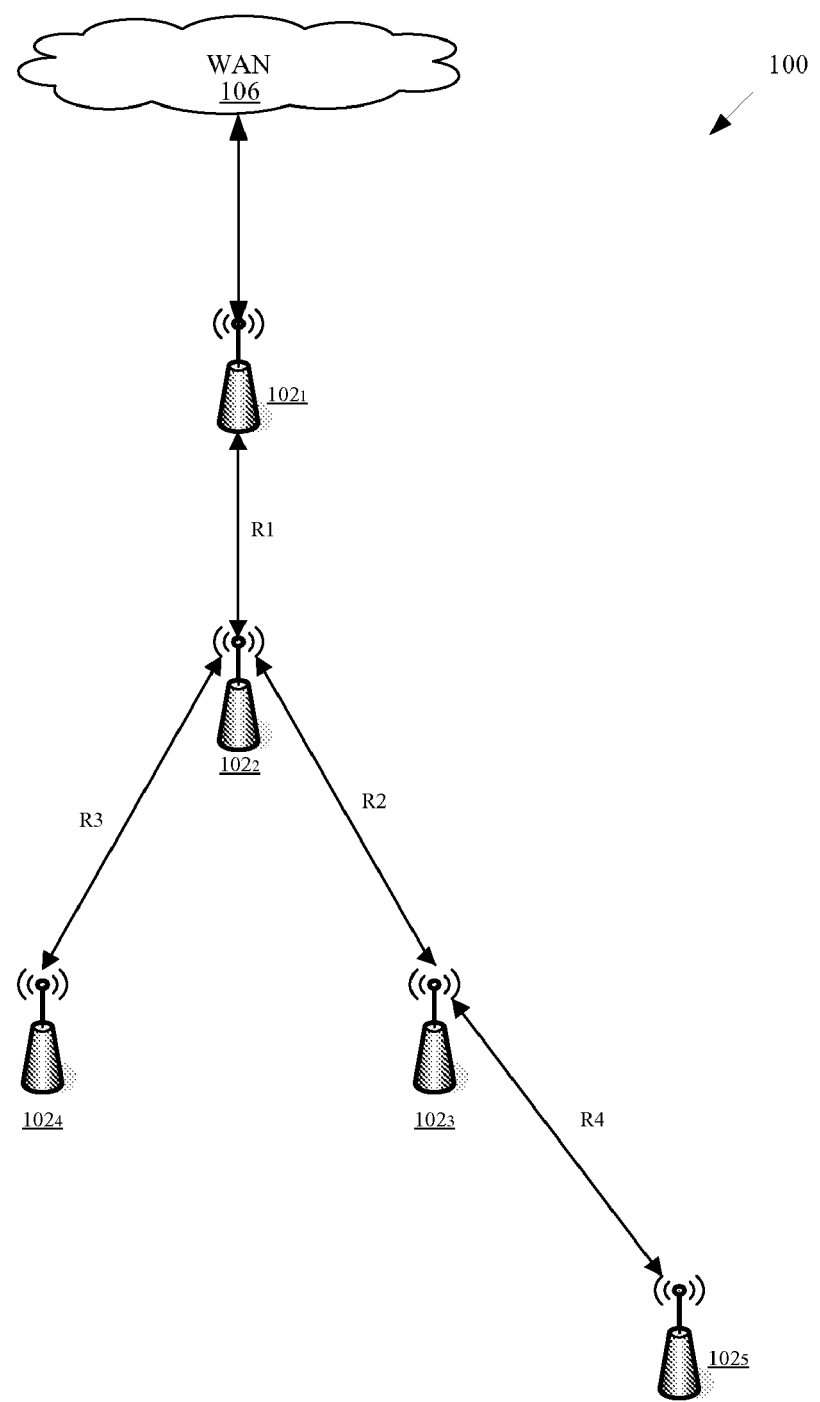
FIG. 1 is a conceptual block diagram illustrating an example of a mesh network.

FIG. 1 is a conceptual block diagram illustrating an example of a mesh network. The mesh network 100 includes a number of mesh access points (MAP)s $102_1$-$102_5$ joined together to connect one or more access terminals (not shown) to a WAN 106, such as the Internet. In this example, one of the MAPs $102_1$ has a wired backhaul connection the WAN 106, and therefore, this MAP $102_1$ is sometimes referred to as the root access point (RAP).

The mesh network 100 is created by establishing radio links between the MAPs $102_1$-$102_5$. In the example shown in FIG. 1, the RAP $102_1$ has a radio link with the MAP $102_2$ that supports a data rate R1. The MAP $102_2$ has a radio link with the MAP $102_3$ that supports a data rate of R2 and another radio link with the MAP $102_4$ that supports a data rate of R3. The MAP $102_3$ has a radio link with the MAP $102_5$ that supports a data rate R4. The radio links may be implemented with any suitable wireless protocol including, by way of example, IEEE 802.11 (Wi-Fi), IEEE 802.20 (Wi-Max), Bluetooth, Ultra Wideband (UWB), or any other wireless protocol having any suitable underlying air interface. Examples of air interfaces include Orthogonal Frequency-Division Multiple Access (OFDMA), Wideband Code Division Multiple Access (W-CDMA), and the like. Moreover, various concepts disclosed throughout this disclosure may be extended wide area networks employing various wireless protocols including, by way of example, CDMA2000, Global System for Mobile Communications (GSM), Ultra Mobile Broadband (UMB), Enhanced Data rates for GSM Evolution (EDGE), etc. The specific wireless protocol used for any mesh network will vary depending on the specific application and the overall design constraints imposed on the overall system.

Figure 2:
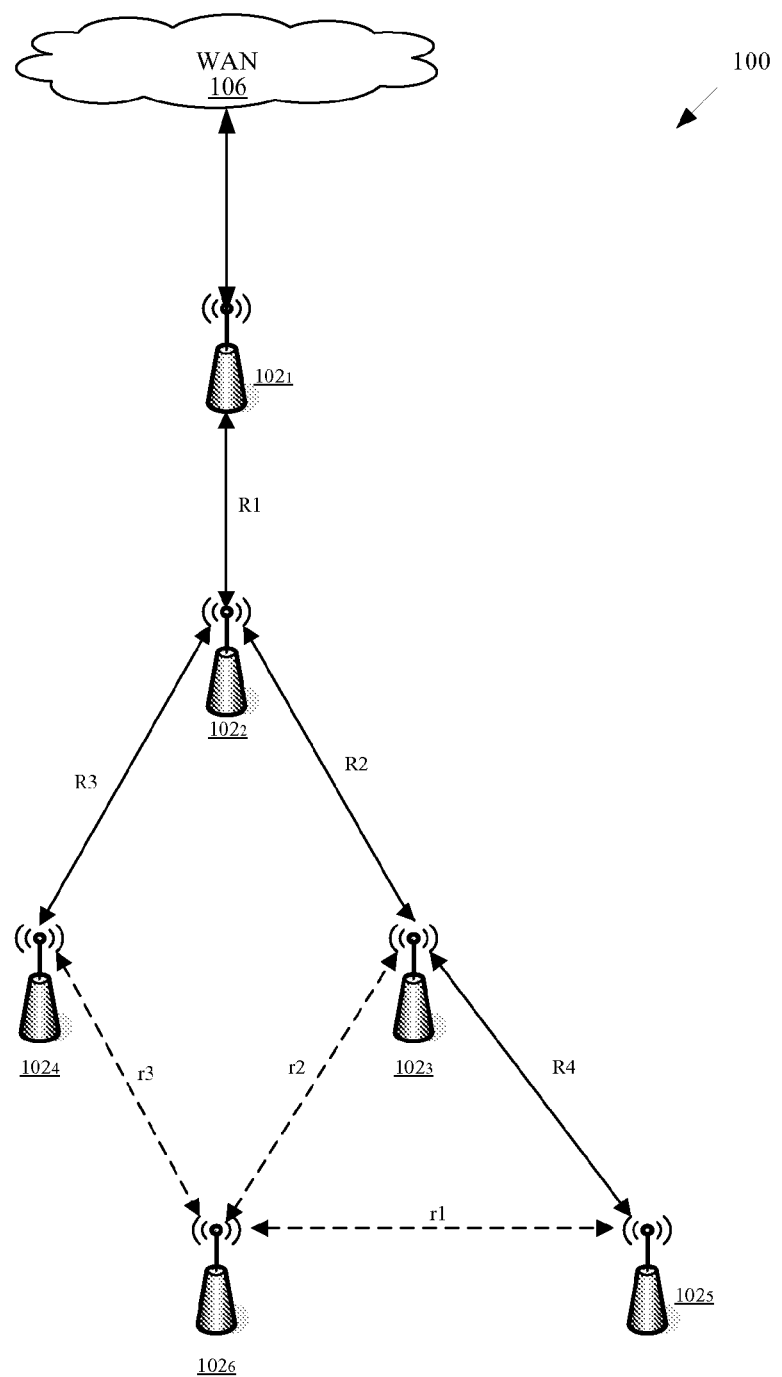
FIG. 2 is a conceptual block diagram illustrating an example of an access point attempting to join the mesh network of FIG. 1.

FIG. 2 is a conceptual block diagram illustrating an example of a MAP $102_6$ attempting to join the mesh network 100 of FIG. 1. When the MAP $102_6$ attempts to join, it determines how it should forward data to the RAP $102_1$. In this example, there are three neighboring MAPs $102_3$, $102_4$, $102_5$ that the MAP $102_6$ can establish a link with and each of the neighboring MAPs $102_3$, $102_4$, $102_5$ may route the data through different paths in the mesh network 100. A number of possible link metrics for selecting the optimal MAP to link up with will now be presented.

The first link metric that will be presented will be referred to as a bottleneck rate based metric. Using this metric, the MAP $102_6$ computes a metric for each available data path and then selects the path that maximizes the metric. The metric is determined by taking the bottleneck link capacity (i.e., the minimum data rate along the path to the RAP $102_1$) divided by the number of hops. By way of example, the metric for the path through the MAP $102_5$ is calculated as follows:

$$\left(\frac{\min(r1, R4, R2, R1)}{4}\right),$$

where r1 is the data rate that can be supported by the radio link between the MAP $102_6$ and the MAP $102_5$. The metric is computed in this manner for the remaining two data paths (i.e., through MAPs $102_3$ and $102_4$) and then the path that maximizes the metric is selected as follows:

$$\arg\max\left(\frac{\min(r1, R4, R2, R1)}{4}, \frac{\min(r2, R2, R1)}{3}, \frac{\min(r3, R3, R1)}{3}\right),$$

where r2 is the data rate that can be supported by the radio link between the MAP $102_6$ and the MAP $102_3$, and r3 is the data rate that can be supported by the radio link between the MAP $102_6$ and the MAP $102_4$.

The bottleneck based rate metric is directed towards optimizing the data rate through the mesh network 100, but does not take into consideration delay. A second link metric that will be presented accounts for the delay through the mesh network 100. This metric may be referred to as a harmonic mean metric. Using this metric, the MAP $102_6$ computes the harmonic mean of the data rate available along each path and selects the path that offers the maximum harmonic mean rate. By way of example, the harmonic mean metric for the path through the MAP $102_5$ is calculated as follows:

$$\left(\cfrac{1}{\frac{1}{r1}+\frac{1}{R4}+\frac{1}{R2}+\frac{1}{R1}}\right).$$

The harmonic metric is computed in this manner for the remaining two paths (i.e., through MAPs 1023 and 1024) and then the path that maximizes the harmonic mean metric is selected as follows:

$$\arg\max\left(\cfrac{1}{\frac{1}{r1}+\frac{1}{R4}+\frac{1}{R2}+\frac{1}{R1}},\ \cfrac{1}{\frac{1}{r2}+\frac{1}{R2}+\frac{1}{R1}},\ \cfrac{1}{\frac{1}{r3}+\frac{1}{R3}+\frac{1}{R1}}\right).$$

It should be noted that the above computation is slightly different from the traditional notion of harmonic mean. The strict definition of harmonic mean of N variable $1/r1, \ldots, 1/rN$ is $N/(1/r1 + \ldots 1/rN)$. The harmonic mean computation provided above is modified in that the term N is dropped from the numerator. As used throughout this disclosure, the term "harmonic mean" shall refer to the computation above.

Another link metric that will be presented may be referred to as a time metric. The time metric is based on the time is takes to transmit a frame of size L along a particular data path in the mesh network. Instead of using the data rates, this metric computes the time to transmit a frame along each available path and then selects the path with that may require the least time. The time metric may be well suited for applications supporting frames with significant overhead. By way of example, the frame transmission time in IEEE 802.11 is given by:

$$T_{frame} = T_o + \frac{L+H}{R},$$

where $T_O$ refers the fixed overheads such as the preamble and $T_{PLCP}$ overheads, and H represents the MAC header. The metric for the above example becomes:

$$\arg\max\left(\begin{array}{c}\cfrac{1}{4T_o+(L+H)\left(\frac{1}{r1}+\frac{1}{R4}+\frac{1}{R2}+\frac{1}{R1}\right)},\\ \cfrac{1}{3T_o+(L+H)\left(\frac{1}{r2}+\frac{1}{R2}+\frac{1}{R1}\right)},\\ \cfrac{1}{3T_o+(L+H)\left(\frac{1}{r3}+\frac{1}{R3}+\frac{1}{R1}\right)}\end{array}\right).$$

When the MAP 1026 attempts to join the mesh network 100, it may use various techniques to obtain the information it needs to compute the metric. In one configuration, the MAP 1026 associates with the mesh network 100 by broadcasting a message. Each MAP within the mesh network 100 that can hear the broadcast message will send a response indicating the number of hops to the RAP 1021 and the metric. The MAP 1026 may then calculate its own metric through each MAP that responded to the broadcast. Basically, for each responding MAP, the MAP 1026 computes its own metric using the data rate that can be supported with the responding MAP and the information in the response from that responding MAP (i.e., the number of hops to the RAP 1021 and the metric). The MAP 1026 then chooses the MAP which maximizes its own metric. The MAP 1026 may continuously update its path to the RAP 1021 by broadcasting the message and making any necessary adjustments to maximize its metric.

The mesh network 100 can be decentralized (with no central server) or centralized (with a central server). In centralized applications, the central server may be used to dynamically configure the data paths through the mesh network. The central server may be a separate entity (not shown), integrated into the RAP 1021, or distributed across one or more access points (i.e., MAPs and/or RAP) in the mesh network 100.

Figure 3:
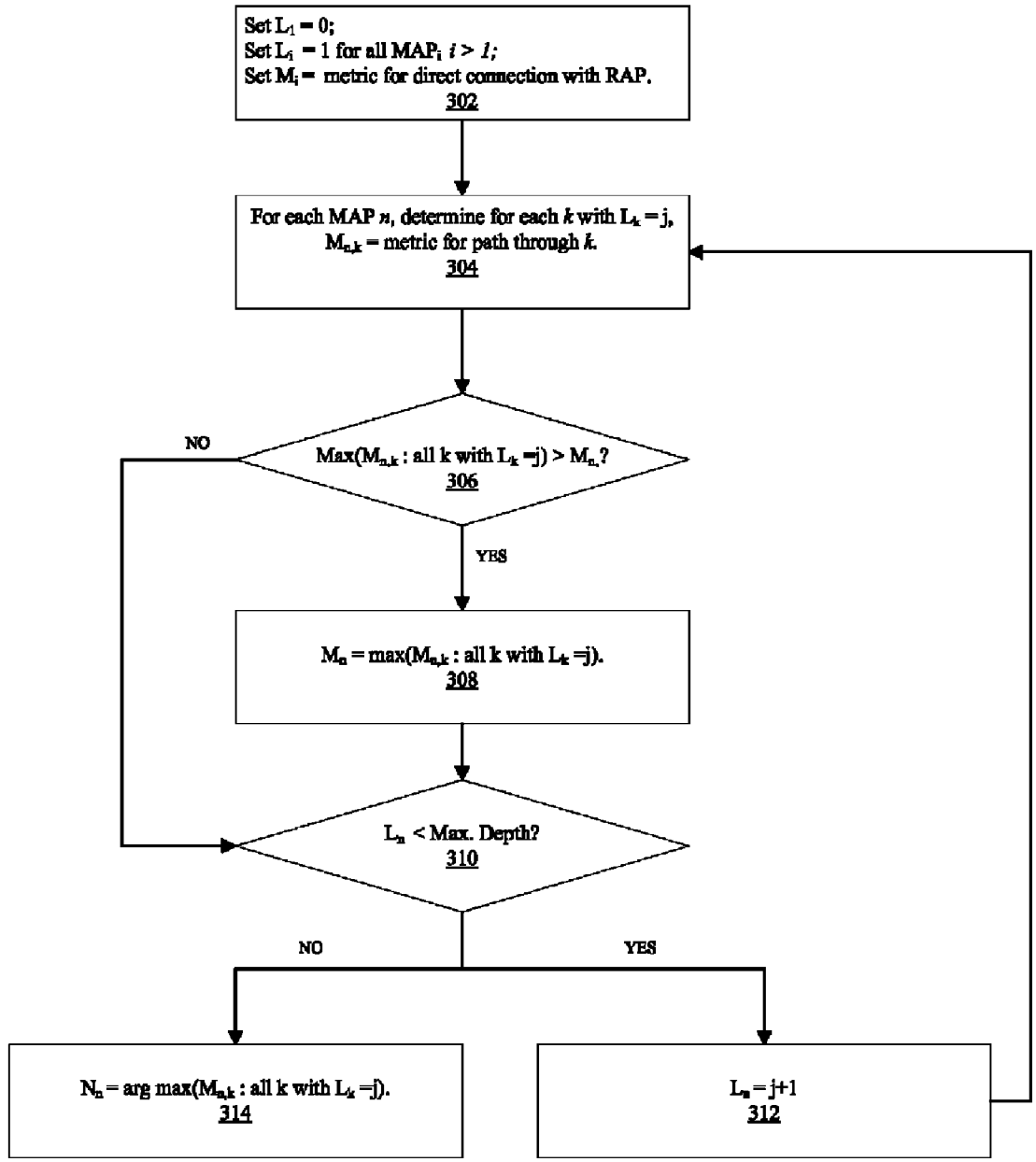
FIG. 3 is a flow chart illustrating an example of an algorithm that may be implemented by the central server to optimize the data paths through a mesh network.

An example of an algorithm that may be implemented by the central server to optimize the data paths through the mesh network 100 will now be presented with reference to FIG. 3. The following notation will be used in this example:
MAP$_i$=the $i^{th}$ MAP in the mesh network;
MAP$_1$=the RAP
L$_i$=the level of MAP$_i$ (i.e., the number of hops from MAP$_i$ to the RAP);
M$_i$=the metric of MAP$_i$;
N$_i$=the neighbor MAP of MAP$_i$.

In step 302, the variables are initialized. In this example, L1 is set to 0, Li is set to 1 for all MAPi, where i>1, and Mi is set to the metric for a direct connection with the RAP (i.e., one hop). The metric Mi may be zero for any MAPi that is too far away from the RAP to support a connection.

Once the variables are initialized, the algorithm may begin computing the metrics. The computation begins with step 304. For each MAPn, a metric Mn,k is determined for each k, with Lk=j, where Mn,k is the metric of the nth MAP for the path through k at the level j. Next, in step 306, the metric for each MAP is maximized by determining whether max(Mn,k: all k with Lk=j)>Mn. If this equation is satisfied, then Mn is set to max(Mn,k: all k with Lk=j) in step 308. Otherwise, this step is skipped.

In step 310, it is determined whether Ln is equal to the maximum depth of the mesh network (i.e., the maximum number of hops between a MAP and the RAP). If Ln is less than the maximum depth of the mesh network, the level is incremented by setting Ln to j+1 in step 312. The algorithm then loops back to step 304 to begin another computation of metrics. If, on the other hand, Ln is equal to the maximum depth of the mesh network, then the optimal path to the RAP is selected for each MAP in step 314 by establishing a link with the neighbor MAP that maximizes the matrix as follows Nn=arg max(Mn,k: all k with Lk=j).

Figure 4A:
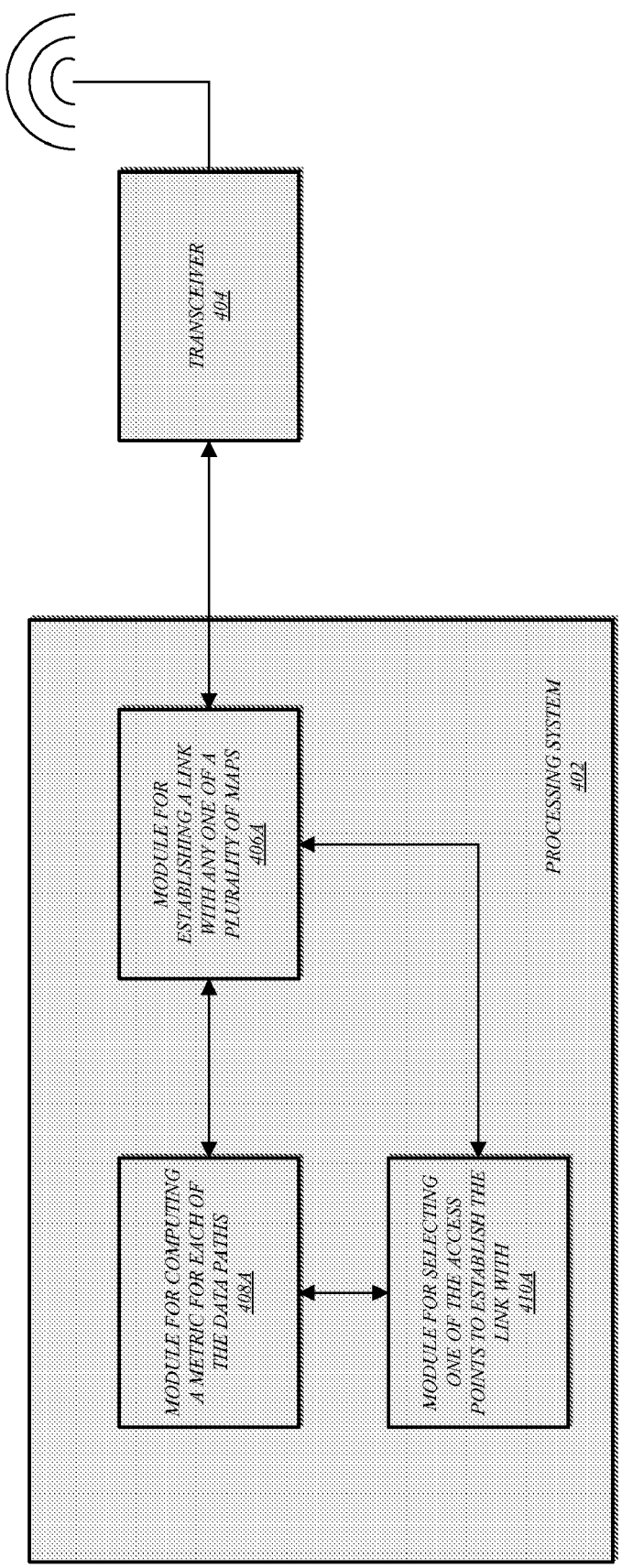
FIG. 4A is a block diagram illustrating an example of the functionality of an access point.
Figure 4B:
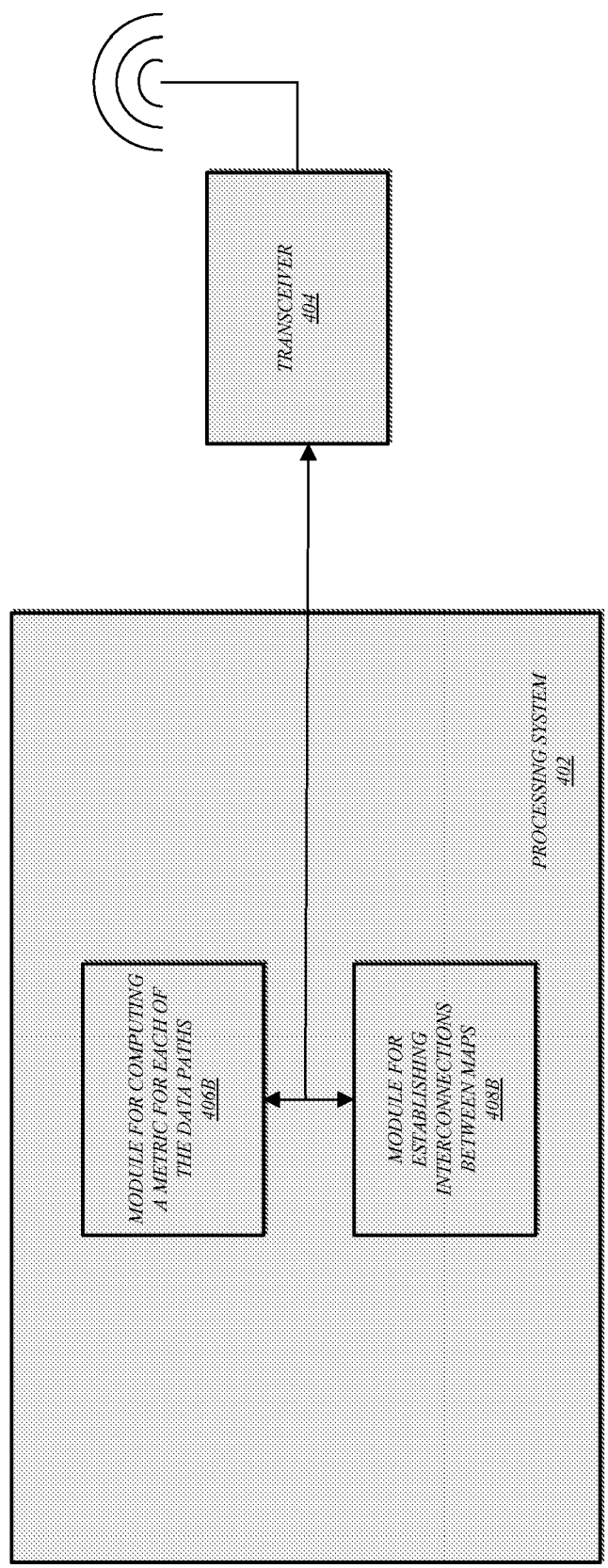
FIG. 4B is a block diagram illustrating another example of the functionality of an access point.

FIGS. 4A and 4B are block diagrams illustrating examples of the functionality of a MAP. The MAP 102 includes a transceiver 404 that provides an air interface with other MAPs in the mesh network. The MAP 102 also includes a processing system 402, which is shown with functional blocks to illustrate its functionality. These functional blocks may be implemented with a processing system comprising hardware, software, firmware, middleware, microcode, hardware description languages, or any combination thereof. By way of example, the functional blocks may be implemented with a processing system that uses program code running on a microprocessor, a digital signal processor (DSP), or any other suitable platform. The processing system may also include computer-readable media for storing the program code. The computer readable media may include one or more storage devices, including by way of example, RAM memory, flash memory, ROM memory, EPROM memory, EEPROM memory, registers, hard disk, a removable disk, a CD-ROM, or any other form of storage media known in the art. Computer readable media may also include a carrier wave that encodes a data signal.

Alternatively, or in addition to, the functional blocks of the processing system may be implemented with an application specific integrated circuit (ASIC), a controller, microcontroller, a state machine, a field programmable gate array (FPGA) or other programmable logic component, discrete gate or transistor logic, discrete hardware components, or any combination thereof. These circuits may or may not use program code that is stored in computer-readable media.

Those skilled in the art will recognize the interchangeability of hardware, firmware, and software configurations under these circumstances, and how best to implement the described functionality for each particular application.

Turning to FIG. 4A, the processing system 402 includes a module 406A for establishing a link with any one of a plurality of MAPs in the mesh network, with each of the MAPs providing a different data path through the mesh network. The processing system 402 also includes a module 408A for computing a metric for each of the data paths, and a module 410A for selecting one of the access points to establish the link with based on the metrics.

Turning to FIG. 4B, the processing system 402 includes a module 406B for computing, for each of the MAPs in the mesh network, a metric for each of a plurality of data paths supportable by that MAP, and a module 408B for establishing interconnections between the access points based on the metrics.

Figure 5A:
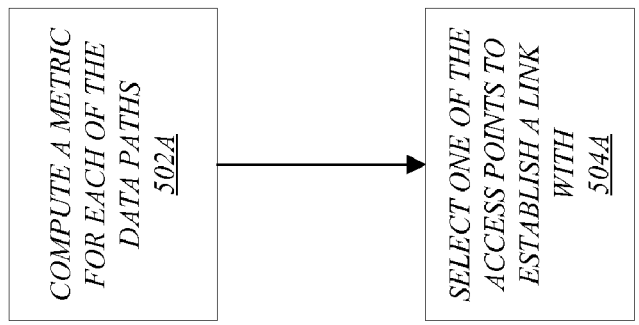
FIG. 5A is a flow chart illustrating an example of a method of establishing a link with any one of a plurality of access points in a mesh network.

FIG. 5A is a flow chart illustrating an example of a method of establishing a link with any one of a plurality of MAPs in a mesh network, with each of the MAPs providing a different data path through the mesh network. In step 502A, a metric for each of the data paths is computed, and in step 504A one of the access points is selected to establish a link with based on the metrics. The computation of the metrics may be performed by in a variety of ways. One way is to divide the minimum data rate supported by one or more hops through a corresponding data path by the number of hops in that path, with data path through the selected access point having the maximum metric. Another way to compute the metrics is by computing the harmonic mean of the data rates supported by the one or more hops through the corresponding data path, with the data path through the selected access point having the maximum harmonic mean data rate. In yet another way, the computation of the metrics may be performed by computing each of the metrics based on the time to transmit a frame of data through the corresponding data path, with the data path through the selected access point having the minimum transmission time. More specifically, the computation of the metrics may be performed by computing each of the metrics by based on the harmonic mean of the data rates supported by the one or more hops through the corresponding data path and the amount of overhead in the frame.

Figure 5B:
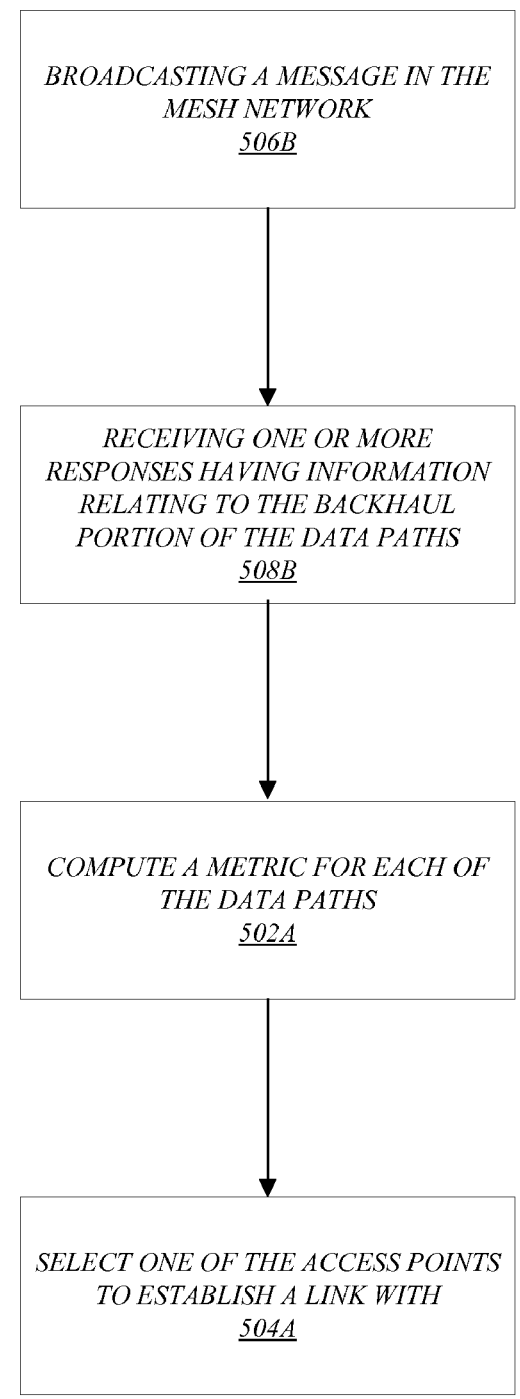
FIG. 5B is a flow chart illustrating a further example of the method of FIG. 5A.

Turning to FIG. 5B, the method of FIG. 5A may also include broadcasting a message in the mesh network in step 506B, receiving one or more responses having information relating to the backhaul portion of the data paths in step 508B, and using the information to compute the metrics in step 502A. The information, in combination with its own metric to the neighboring MAPs, may be used to compute each of the metrics for the corresponding data paths.

Figure 5C:
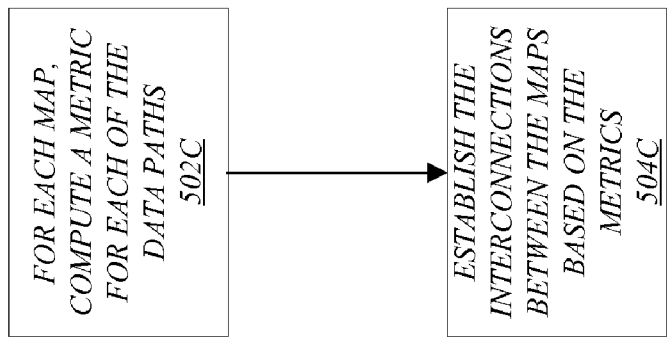
FIG. 5C is a flow chart illustrating an example of a method of establishing the interconnections in a centralized mesh network.

FIG. 5C is a flow chart illustrating an example of a method of operating in a mesh network having a plurality of access points. In step 502C, for each MAP, a metric is computed for each of a plurality of data paths supportable by that MAP. In step 504C, the interconnections between the MAPs are established based on the metrics. The computation may be performed by computing, for each of the MAPs, the metric for each of the data paths supported by that MAP having j hops through the mesh network, increasing j by one, and repeating the computation for each of the MAPs. The computation may be performed for each of the MAPs for each of the j hops through the mesh network as j goes from one to the maximum depth of the mesh network. An example of one algorithm has been described earlier in connection with FIG. 3

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus, comprising:
   a processing system configured to establish a link with anyone of a plurality of access points in a mesh network, each of the access points providing the apparatus with a different data path through the mesh network,
   wherein each of the data paths includes one or more hops, and
   wherein the processing system is further configured to compute a metric for each of the data paths by dividing a minimum data rate supported by the one or more hops through a corresponding data path by the number of hops and,
   wherein the processing system is further configured to select the access point for the data path having a maximum metric to establish the link.

2. The apparatus of claim 1 wherein the processing system is further configured to broadcast a message in the mesh network, receive one or more responses having information relating to backhaul links of the data paths, and use the information to compute the metrics.

3. An apparatus, comprising:
   a processing system configured to establish a link with anyone of a plurality of access points in a mesh network, each of the access points providing the apparatus with a different data path through the mesh network,
   wherein each of the data paths includes one or more hops,
   wherein the processing system is further configured to compute a metric for each of the data paths by computing a harmonic mean of data rates supported by the one or more hops through a corresponding data path, and
   wherein the processing system is further configured to select the access point for the data path having a maximum harmonic mean data rate to establish the link.

4. The apparatus of claim 3 wherein the processing system is further configured to broadcast a message in the mesh network, receive one or more responses having information relating to backhaul links of the data paths, and use the information to compute the metrics.

5. An apparatus, comprising:
a processing system configured to establish a link with anyone of a plurality of access points in a mesh network, each of the access points providing the apparatus with a different data path through the mesh network,
wherein each of the data paths includes one or more hops through the mesh network,
wherein the processing system is further configured to compute a metric for each of the data paths based on a time to transmit a frame of data through a corresponding data path, based on a harmonic mean of data rates supported by the one or more hops through the corresponding data path and based on an amount of overhead in the frame, and
wherein the processing system is further configured to select the access point for the data path having a minimum transmission time to establish the link.

6. The apparatus of claim 5 wherein the processing system is further configured to broadcast a message in the mesh network, receive one or more responses having information relating to backhaul links of the data paths, and use the information to compute the metrics.

7. A method of establishing a link with anyone of a plurality of access points in a mesh network, each of the access points providing a different data path through the mesh network, the method comprising:
computing a metric for each of the data paths, wherein each of the data paths includes one or more hops, and
wherein the computation of the metrics further comprises computing each of the metrics by dividing a minimum data rate supported by the one or more hops through a corresponding data path by the number of hops; and
selecting one of the access points to establish a link with based on the metrics, the data path through the selected access point having a maximum metric.

8. The method of claim 7 further comprising broadcasting a message in the mesh network, receiving one or more responses having information relating to backhaul links of the data paths, and using the information to compute the metrics.

9. A method of establishing a link with anyone of a plurality of access points in a mesh network, each of the access points providing a different data path through the mesh network, the method comprising:
computing a metric for each of the data paths, wherein each of the data paths includes one or more hops, and
wherein the computation of the metrics further comprises computing each of the metrics by computing a harmonic mean of data rates supported by the one or more hops through the corresponding data path; and
selecting one of the access points to establish a link with based on the metrics and the data path through the selected access point having a maximum harmonic mean data rate.

10. The method of claim 9 further comprising broadcasting a message in the mesh network, receiving one or more responses having information relating to backhaul links of the data paths, and using the information to compute the metrics.

11. A method of establishing a link with anyone of a plurality of access points in a mesh network, each of the access points providing a different data path through the mesh network, the method comprising:
computing a metric for each of the data paths, wherein each of the data paths includes one or more hops through the mesh network, and
wherein the computation of the metrics comprises computing each of the metrics based on a time to transmit a frame of data through a corresponding data path, and
wherein the computation of the metrics further comprises computing each of the metrics based on a harmonic mean of data rates supported by the one or more hops through the corresponding data path and an amount of overhead in the frame; and
selecting one of the access points to establish a link with based on the metrics and the data path through the selected access point having a minimum transmission time.

12. The method of claim 11 further comprising broadcasting a message in the mesh network, receiving one or more responses having information relating to backhaul links of the data paths, and using the information to compute the metrics.

13. An apparatus, comprising:
means for establishing a link with anyone of a plurality of access points in a mesh network, each of the access points providing the apparatus with a different data path through the mesh network;
computing means for computing a metric for each of the data paths based on a data rate associated with the corresponding data path,
wherein each of the data paths includes one or more hops,
wherein the computing means is configured to compute each of the metrics by dividing a minimum data rate supported by the one or more hops through the corresponding data path by the number of hops; and
selecting means for selecting one of the access points to establish the link with based on the metrics, wherein the selecting means is configured to select the access point for the data path having a maximum metric.

14. An apparatus, comprising:
means for establishing a link with anyone of a plurality of access points in a mesh network, each of the access points providing the apparatus with a different data path through the mesh network;
computing means for computing a metric for each of the data paths based on a data rate associated with the corresponding data path,
wherein each of the data paths includes one or more hops,
wherein the computing means is configured to compute each of the metrics by computing a harmonic mean of data rates supported by the one or more hops through the corresponding data path; and
selecting means for selecting one of the access points to establish the link with based on the metrics, wherein the selecting means is configured to select the access point for the data path having a maximum harmonic mean data rate.

15. An apparatus, comprising:
means for establishing a link with anyone of a plurality of access points in a mesh network, each of the access points providing the apparatus with a different data path through the mesh network,
wherein each of the data paths includes one or more hops through the mesh network;
computing means for computing a metric for each of the data paths based on a data rate associated with the corresponding data path,
wherein the computing means is configured to compute each of the metrics based on a time to transmit a frame of data through the corresponding data path,
wherein the computing means is further configured to compute each of the metrics based on a harmonic mean of data rates supported by the one or more hops through the corresponding data path, wherein the computing means is further configured to compute each of the metrics based on an amount of overhead in the frame; and selecting means for selecting one of the access points to establish the link with based on the metrics, wherein the selecting means is configured to select the access point for the data path having a minimum transmission time.

16. A computer program product for enabling an apparatus to operate in a mesh network, comprising:

non-transitory computer-readable storage medium comprising, code to establish a link with anyone of a plurality of access points in a mesh network, each of the access points providing the apparatus with a different data path through the mesh network;

code to compute a metric for each of the data paths wherein each of the data paths includes one or more hops, wherein the metric is computed by dividing a minimum data rate supported by the one or more hops through a corresponding data path by the number of hops; and code to select one of the access points to establish the link with based on the metrics, wherein the access point is selected for the data path having a maximum metric to establish the link.

17. A computer program product for enabling an apparatus to operate in a mesh network, comprising:

non-transitory computer-readable storage medium comprising, code to establish a link with anyone of a plurality of access points in a mesh network, each of the access points providing the apparatus with a different data path through the mesh network;

code to compute a metric for each of the data paths wherein each of the data paths includes one or more hops, wherein the metric is computed by computing a harmonic mean of data rates supported by the one or more hops through a corresponding data path; and code to select one of the access points to establish the link with based on the metrics, wherein the access point is selected for the data path having a maximum harmonic mean data rate to establish the link.

18. A computer program product for enabling an apparatus to operate in a mesh network, comprising:

non-transitory computer-readable storage medium comprising, code to establish a link with anyone of a plurality of access points in a mesh network, each of the access points providing the apparatus with a different data path through the mesh network;

code to compute a metric for each of the data paths wherein each of the data paths includes one or more hops, wherein the metric is computed based on a time to transmit a frame of data through a corresponding data path, based on a harmonic mean of data rates supported by the one or more hops through the corresponding data path and based on an amount of overhead in the frame; and code to select one of the access points to establish the link with based on the metrics, wherein the access point is selected for the data path having a minimum transmission time to establish the link.

19. An access point, comprising:

a processing system configured to establish a link with anyone of a plurality of access points in a mesh network, each of the access points providing the apparatus with a different data path through the mesh network, wherein each of the data paths includes one or more hops, wherein the processing system is further configured to compute a metric for each of the data paths by dividing a minimum data rate supported by the one or more hops through a corresponding data path by the number of hops, and wherein the processing system is further configured to select the access point for the data path having a maximum metric to establish the link; and a transceiver configured to support the link between the processing system and the selected access point.

20. An access point, comprising:

a processing system configured to establish a link with anyone of a plurality of access points in a mesh network, each of the access points providing the apparatus with a different data path through the mesh network, wherein each of the data paths includes one or more hops, wherein the processing system is further configured to compute a metric for each of the data paths by computing a harmonic mean of data rates supported by the one or more hops through a corresponding data path, and wherein the processing system is further configured to select the access point for the data path having a maximum harmonic mean data rate to establish the link; and a transceiver configured to support the link between the processing system and the selected access point.

21. An access point, comprising:

a processing system configured to establish a link with anyone of a plurality of access points in a mesh network, each of the access points providing the apparatus with a different data path through the mesh network, wherein each of the data paths includes one or more hops through the mesh network, wherein the processing system is further configured to compute a metric for each of the data paths based on a time to transmit a frame of data through a corresponding data path, based on a harmonic mean of data rates supported by the one or more hops through the corresponding data path and based on an amount of overhead in the frame, and wherein the processing system is further configured to select the access point for the data path having minimum transmission time to establish the link.

* * * * *